US010816481B2

(12) United States Patent
Forestelli et al.

(10) Patent No.: US 10,816,481 B2
(45) Date of Patent: Oct. 27, 2020

(54) NON-DESTRUCTIVE MEASUREMENT UNIT OF THE GAS CONCENTRATION IN SEALED FLEXIBLE CONTAINERS AND AUTOMATIC FILLING AND/OR PACKAGING LINE USING SUCH A UNIT

(71) Applicant: FT SYSTEM S.R.L., Alseno (IT)

(72) Inventors: Fabio Forestelli, Castelnuovo Fogliani (IT); Gian Carlo Frazzi, Salsomaggiore Terme (IT)

(73) Assignee: FT SYSTEM S.R.L., Alseno (PC) (IT)

( * ) Notice: Subject to any disclaimer, the term of this patent is extended or adjusted under 35 U.S.C. 154(b) by 88 days.

(21) Appl. No.: 16/095,071

(22) PCT Filed: Apr. 19, 2017

(86) PCT No.: PCT/IB2017/052249
§ 371 (c)(1),
(2) Date: Oct. 19, 2018

(87) PCT Pub. No.: WO2017/182964
PCT Pub. Date: Oct. 26, 2017

(65) Prior Publication Data
US 2019/0113465 A1    Apr. 18, 2019

(30) Foreign Application Priority Data

Apr. 20, 2016    (IT) .......................... UA2016A002750

(51) Int. Cl.
*G01N 21/90*    (2006.01)
*G01N 21/3504*    (2014.01)
(Continued)

(52) U.S. Cl.
CPC ........ *G01N 21/9081* (2013.01); *A23L 3/3418* (2013.01); *B65B 1/00* (2013.01);
(Continued)

(58) Field of Classification Search
CPC ........... G01N 21/9081; G01N 21/0303; G01N 21/3504; G01N 2021/0364;
(Continued)

(56) References Cited

U.S. PATENT DOCUMENTS 7,779,674 B2    8/2010  Forestelli
8,379,209 B2    2/2013  Yokobasyashi et al.
(Continued)

FOREIGN PATENT DOCUMENTS

WO    WO-2016051341 A1 * 4/2016 ............. G01L 11/02

*Primary Examiner* — Jamil Ahmed
(74) *Attorney, Agent, or Firm* — Howson & Howson LLP (57) ABSTRACT

A non-destructive measurement unit of gas concentration in sealed containers and an automatic filling and/or packaging line using such a unit are provided. The flexible containers are at least partially optically transparent, and the measurement unit comprises a light source for emitting a light beam at a wavelength tunable with an absorption wavelength of a gas contained in the sealed flexible container. The light source directs the light beam toward at least one inspection area, and a detector detects at least a portion of the beam after the beam passes through the inspection area and outputs data representative of an absorption spectrum of the gas. Means for generating a head space of predefined width into the sealed flexible container is adapted to advance the sealed flexible container by an advancement path which crosses the inspection zone and to maintain the predefined width of the head space during the advancement.

18 Claims, 8 Drawing Sheets

(51) Int. Cl.
- *B65B 57/10* (2006.01)
- *G01N 21/03* (2006.01)
- *A23L 3/3418* (2006.01)
- *B65B 59/00* (2006.01)
- *B65B 1/00* (2006.01)
- *B65B 5/00* (2006.01)
- *B65B 57/16* (2006.01)
- *B65B 3/00* (2006.01)
- *G01N 21/84* (2006.01)
- *G01N 21/31* (2006.01)

(52) U.S. Cl.
CPC ............ *B65B 3/00* (2013.01); *B65B 5/00* (2013.01); *B65B 57/10* (2013.01); *B65B 57/16* (2013.01); *B65B 59/00* (2013.01); *G01N 21/0303* (2013.01); *G01N 21/3504* (2013.01); *G01N 2021/0364* (2013.01); *G01N 2021/3129* (2013.01); *G01N 2021/845* (2013.01); *G01N 2201/023* (2013.01)

(58) Field of Classification Search
CPC ......... G01N 21/3129; G01N 2021/845; G01N 2201/023; A23L 3/3418; B65B 1/00; B65B 3/00; B65B 5/00; B65B 57/10; B65B 57/16; B65B 59/00
See application file for complete search history.

(56) References Cited

U.S. PATENT DOCUMENTS

| | | |
|---|---|---|
| 9,266,706 B2 | 2/2016 | Forestelli et al. |
| 9,296,599 B2 | 3/2016 | Forestelli et al. |
| 2008/0028876 A1* | 2/2008 | Forestelli ............. B07C 5/3408 73/865.8 |
| 2012/0247064 A1 | 10/2012 | Forestelli et al. |
| 2013/0199127 A1 | 8/2013 | Forestelli et al. |
| 2016/0169796 A1 | 6/2016 | Lewander Xu et al. |
| 2017/0299455 A1* | 10/2017 | Forestelli ................ G01L 11/02 |

* cited by examiner

NON-DESTRUCTIVE MEASUREMENT UNIT OF THE GAS CONCENTRATION IN SEALED FLEXIBLE CONTAINERS AND AUTOMATIC FILLING AND/OR PACKAGING LINE USING SUCH A UNIT

The present invention relates to a non-destructive measurement unit of the gas concentration in sealed containers, as well as to an automatic filling and/or packaging line using such a unit. In particular, the present invention relates to a unit for measuring the gas concentration in flexible containers.

In the present description and in the following claims, the term "flexible container" means any container provided with at least one wall or wall portion made of a flexible material, such as non-rigid plastic bags or trays. Such containers are commonly used for modified atmosphere product packaging, i.e. according to methods indicated by the acronym MAP.

Specifically, the invention relates to a non-destructive measurement unit of the gas concentration in sealed flexible containers, partially or entirely made of an at least partially optically transparent material, particularly plastic material.

In the present description and in the following claims, the expression "at least partially optically transparent material" means a material with such an absorbance that allows a photoreceiver to be sensitive to an optical signal transmitted by a light source and having an optical path passing through such a material.

In container filling and/or packaging lines in general, an important verification required is checking the gas concentration inside the container, once filled and sealed.

To date there are no non-destructive techniques for inspecting flexible containers implementable directly in the line. The measurement of the gas concentration inside the containers, in fact, takes place by means of destructive techniques which involve collecting and analyzing a sample of air inside the container after piercing it. This clearly prevents the possibility of carrying out a check on the totality of the containers processed in the line.

In the context of filling lines of rigid containers, it is known to inspect the inside content of gases through absorption spectroscopy techniques. These techniques are for example used in the pharmaceutical industry to measure the oxygen content in freeze-dried drug vials and provide accurate and repeatable measurements due to the fixed and predefined geometry of the head space through which the measurement is made. In fact, the precise dimensions of the head space are necessary for the correct interpretation of the measured value.

In the present description and following claims, the term "head space" means the area enclosed in the sealed container in which the filling material (such as liquid or solid) is not present.

However, flexible containers do not have a predefined geometry and therefore do not ensure an accuracy of shape and dimensions of the head space through which a measurement by infrared absorption spectroscopy can be carried out. In fact, the head space can vary in terms of both dimensions and shape according to the specific instant conditions of each container.

In order to apply the absorption spectroscopy techniques also to the measurement of flexible containers, it has been proposed to subject the flexible container to mechanical action in order to deform it and bring it, before the measurement, to an at least partially predefined shape condition, as described in document WO 2014/191438. The known solution therefore provides mechanical handling means of the container which cause the expansion of a portion of the container until it takes the predetermined dimensions of a measurement space towards which a light source and a detector face.

However, the Applicant has noted that such a solution is not suitable for a dynamic moving measurement use. On the contrary, the measurement of the gas content described in WO 2014/191438 is static, requiring the placement of the container at the deformation means as well as the activation of the same before proceeding with the measurement.

Likewise, also document U.S. Pat. No. 8,379,209 describes a non-destructive measurement of the oxygen concentration within biological material bags using laser spectroscopy. While such a measurement is carried out in line, it requires stopping the bags at three locations and subsequently moving the measuring instrument between the stop locations. Also in this case, means are provided for a punctual mechanical action which make a portion of the bag take a known dimension on the basis of which it is possible to perform the measurement.

The Applicant has therefore found that the known solutions are not suitable for a dynamic use, since they do not allow operating at the high advancement speeds typical of food filling and/or packaging lines.

In the present description and following claims, the expression "high advancement speed" means an advancement speed of the line up to 100 meters/minute.

The problem underlying the present invention is therefore to provide a non-destructive measurement unit of the gas concentration in sealed flexible containers which is able to dynamically operate, i.e. to take measurements while the containers are moving, therefore without having to stop the line advancement.

Within the scope of this problem, an object of the present invention is to devise a non-destructive measurement unit of the gas concentration in sealed flexible containers which is able to take measurements while the containers are moved at the advancement speeds typical of food filling and/or packaging lines.

In particular, a further object of the present invention is to provide a non-destructive measurement unit of the gas concentration in sealed flexible containers which is able to obtain, in a moving container, a head space having predetermined dimensions and to maintain it for a period of time sufficient to complete a measurement while the container is moving.

According to a first aspect thereof, the invention therefore relates to a non-destructive measurement unit of the gas concentration in sealed flexible containers at least partially made of optically transparent material, comprising:

at least one light source for emitting a light beam at a wavelength tunable with an absorption wavelength of a gas contained in the sealed flexible container, the at least one light source being positioned in such a way as to direct the light beam towards at least one inspection area;

at least one detector positioned in such a way as to detect at least a portion of the light beam emitted by the light source once passed through the inspection zone and to output data representative of an absorption spectrum of said gas resulting from the passage of the light beam through the inspection zone;

means for generating a head space having predetermined width in the sealed flexible container;

and is characterized in that the means for generating a head space are adapted to advance the sealed flexible container by an advancement path which crosses the inspection zone, the means for generating a head space being further adapted to maintain the predetermined width of the head space during the advancement of the sealed flexible container along the whole advancement path.

The Applicant has perceived that, through the use of means for generating a head space of predefined width able to maintain such a condition in which the container has the head space of predefined width during a movement of the same, it is not necessary anymore to stop the container to make a measurement of the concentration of a gas inside the container through an absorption spectroscopy technique.

The Applicant has further found that, by the use of such means for generating a head space having predetermined width, it is not even necessary to slow down the containers entering into the measuring station in order to be able to take the measurement. In this way, it is therefore possible to test all of the containers handled by the filling and/or packaging line without having to renounce the production speeds currently offered by these lines.

Last but not least, the Applicant has considered that the packaging heads are capable of delivering mixtures of different gases into the containers according to the specific packaging made, making it necessary to be able to monitor, with the same instrument, the concentration of a plurality of different gases according to the particular mixture delivered by the heads. In the measurement unit according to the invention, this is possible through the use of a source for emitting a light beam at a wavelength tunable with an absorption wavelength of a specific gas.

According to a second aspect thereof, the invention relates to an automatic filling and/or packaging line of sealed flexible containers at least partially made of optically transparent material comprising conveying means adapted to advance a plurality of containers along an advancement path, along such an advancement path a first filling station of the flexible containers, and a second sealing station of the flexible containers being arranged in succession comprising a plurality of sealing heads, characterized in that downstream of the second sealing station with respect to the advancement path at least one non-destructive measurement unit of the gas concentration in sealed flexible containers is arranged, which is at least partially made of optically transparent material as described above.

Advantageously, the automatic filling and/or packaging line according to the invention achieves the technical effects described above in relation to the non-destructive measurement unit of the gas concentration in sealed flexible containers.

Moreover, the automatic filling and/or packaging line of sealed flexible containers according to the invention allows monitoring any operating defects to a specific filling head, since the measurement unit can be associated with a plurality of packaging heads with which the line is generally provided.

The present invention may have at least one of the following preferred features; the latter may in particular be combined with each other as desired to meet specific application requirements.

Preferably, the means for generating a head space comprise a compression and/or advancement assembly of the container and a containment channel of the container which crosses the inspection zone.

The Applicant has found that a non-destructive measurement unit thus conceived is advantageously capable of ensuring the creation, in a repeatable and reliable manner, of a geometrically defined head space on which the measurement of the gas concentration inside the packaging can be carried out and which can be maintained during the advancement of the container.

More preferably, the compression and/or advancement assembly of the container comprises a pair of motorized belts placed side by side in such a way as to define an advancement passage between them for the container and exert a compression onto the same, the containment channel of the container being made at the advancement passage.

In particular, the use of motorized belts for the compression of the container advantageously allows at the same time to advance the container, ensuring that the compression action that creates the head space is maintained for an entire advancement path.

Even more preferably, the compression and/or advancement assembly of the container is placed at a first height and the containment channel of the container is placed at a second height different from the first one.

Even more preferably, the compression and/or advancement assembly is placed at a lower height while the containment channel is placed at a higher height.

Preferably, the belts of the pair of motorized belts are movable towards/away from each other.

More preferably, the belts are made, at least on their surface facing outward, of a material with a high friction coefficient.

This advantageously allows preventing relative slipping between the container and the belts, providing a homogeneous advancement of the container in conjunction with the compression action exerted by the belts that causes the generation of the head space of predefined width.

Preferably, the containment channel is defined between a pair of containment guides fixable at a predetermined distance from each other which determines the width of the containment channel.

More preferably, the surface of the containment guides facing towards the containment channel is shaped in such a way as to impart an optimized geometry to the containment channel.

Even more preferably, the surface of the pair of containment guides facing towards the containment channel comprises on top of it a portion extending towards the interior of the containment channel, substantially defining a shaping of the containment surface provided with an upper portion.

Advantageously, the shaping of the containment surface provided with an upper portion further delimits the expansion of the head space, ensuring a uniform support of the container surface against the surface of the containment channel.

Preferably, upper guides are provided, arranged transversally to the extension of the containment guides and to which the containment guides are suspended in a translatable manner for a mutual approach/removal during the adjustment of the width of the containment channel.

Alternatively, the containment channel is defined by the lower surface of a longitudinal containment guide carried between the two motorized belts.

Preferably, the lower surface of the longitudinal containment guide has a concave shaping.

More preferably, the lower surface of the longitudinal containment guide has a trapezoidal cross-section shaping.

Preferably, the surface of each containment guide facing towards the containment channel has a low friction coefficient.

Preferably, the at least one light source and the at least one detector are positioned in such a way as to face towards the interior of the containment channel through respective holes made on the surface of the containment guides facing towards the containment channel.

More preferably, the at least one light source and the at least one detector are facing towards the containment channel from the inclined portions of the lower surface of the longitudinal containment guide.

More preferably, on the surface of the containment guides facing towards the containment channel, in the proximity of the holes from which the at least one light source and the at least one detector face towards the containment channel, a plurality of gas outlet ports is provided for introducing a gas other than the measurement one into the containment channel.

Alternatively or additionally, on the surface of the containment guides facing towards the containment channel, in the proximity of the holes from which the at least one light source and the at least one detector face towards the containment channel, a plurality of openings is provided for connecting to means for generating a vacuum for attracting the container surface against the surface of the containment guides.

Preferably, the motorized belts of the pair of belts are directed in such a way as to slide about a vertical axis and placed facing one another so as to exert a compression of the container according to a horizontal axis.

More preferably, the belts of the pair of motorized belts are movable towards/away from each other.

Alternatively, the motorized belts of the pair of belts are directed in such a way as to slide about a horizontal axis and exert a compression of the container according to a vertical axis.

More preferably, the belts of the pair of motorized belts are movable towards/away with respect to the advancement plane of the containers.

Preferably, the at least one light source and the at least one detector are arranged mutually facing.

Alternatively, the at least one light source and the at least one detector are arranged side by side and facing towards at least one surface portion at least partially reflective and/or diffusing.

Preferably, at least one position detector is implemented in the containment guides, which is able to detect the passage of a transiting container, the at least one position detector being arranged upstream of the pair of at least one light source and at least one detector with respect to the advancement direction of the container.

Further features and advantages of the present invention will appear more clearly from the following detailed description of some preferred embodiments thereof, made with reference to the accompanying drawings.

The different features in the single configurations may be combined with one another as desired according to the description above, to make use of the advantages resulting in a specific way from a particular combination.

In such drawings.

In the following description, identical reference numerals are used for the illustration of the figures to indicate construction elements having the same function. Moreover, for clarity of illustration, some numerical references may be not repeated in all the figures.

With reference to the figures, some embodiments are shown of non-destructive measurement units of the gas concentration in sealed flexible containers according to the present invention, globally indicated with reference numerals 10 or 10'.

Figure 1A:
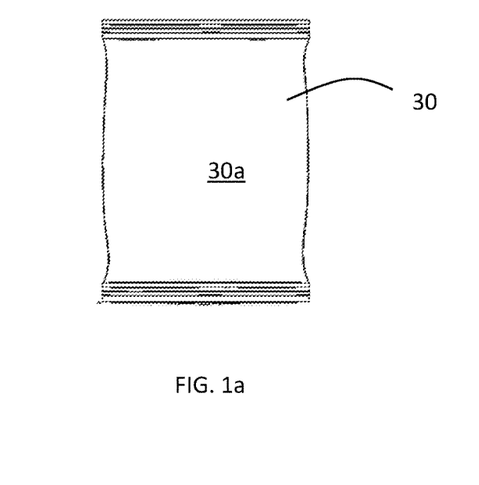
FIGS. 1a and 1b are schematic representations of flexible containers for MAP packaging.

In the present description and in the following claims, it is assumed that the sealed containers 30, 30' subjected to measurement are at least partially made of optically transparent material, in addition to having at least one flexible wall portion. Moreover, it is assumed that the sealed flexible containers have a prevailing extension in two dimensions that defines the main faces 30a, 30a' of the container, as shown by way of example in FIGS. 1a and 1b.

Figure 1B:
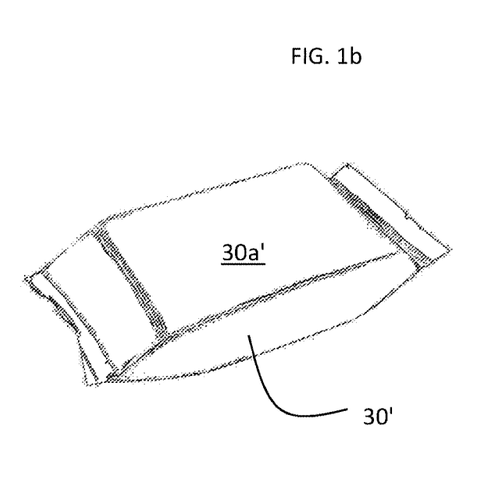

In the filling and/or packaging lines, such containers are generally made to advance forward in a vertical or horizontal configuration depending on the arrangement of the product inside the container. By vertical advancement configuration it is meant an arrangement of the container with its main faces 30a arranged substantially orthogonal to the ground (FIG. 1a), while by horizontal advancement configuration it is meant an arrangement in which the main faces 30a' of the container are substantially parallel to the ground (FIG. 1b).

Figure 2:
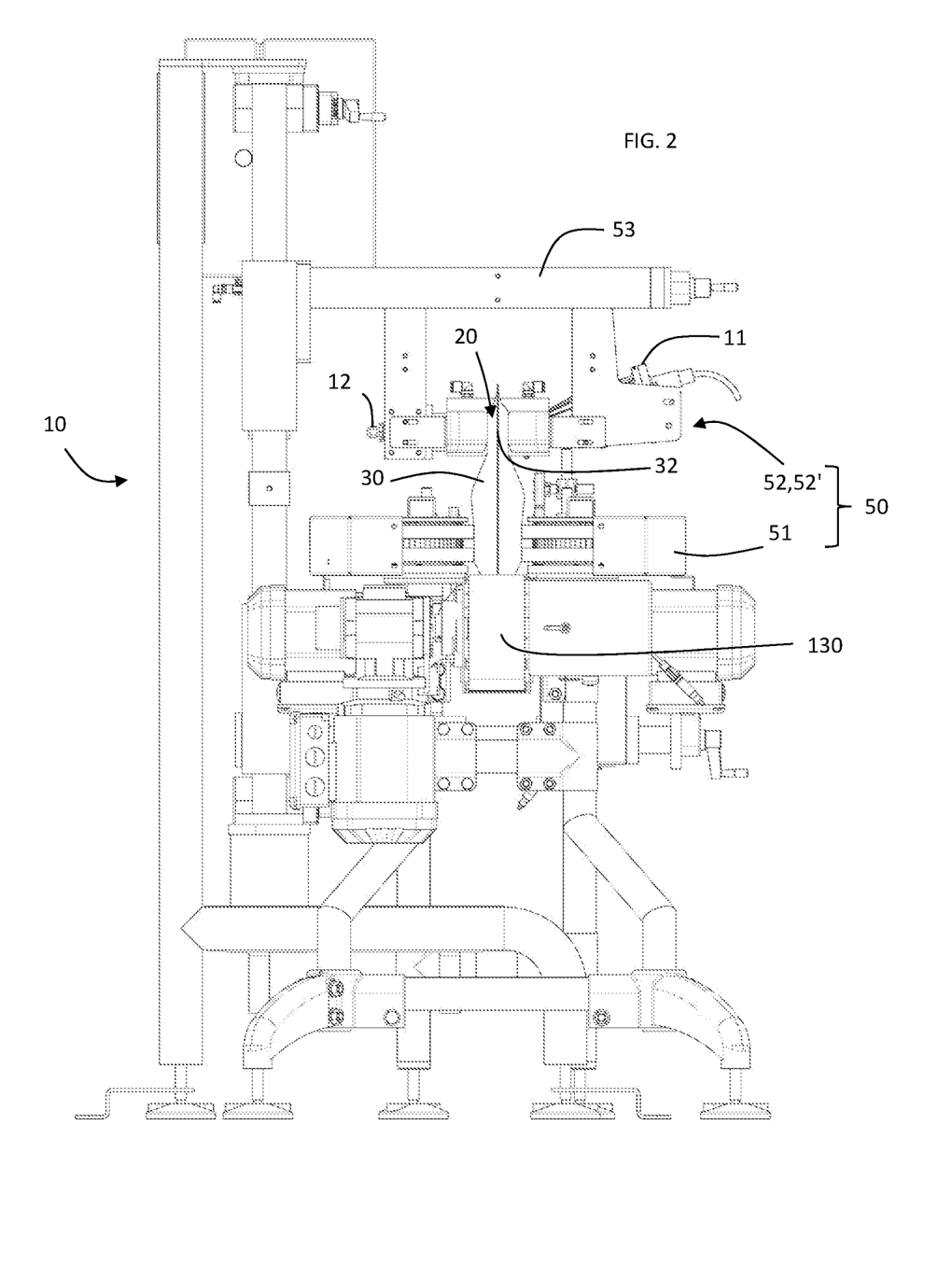
FIG. 2 is a first side elevation view of a first embodiment of the non-destructive measurement unit of the gas concentration in sealed flexible containers according to the present invention.

With specific reference to the FIG. 2, a first embodiment of a non-destructive measurement unit 10 of the gas concentration in sealed flexible containers is shown, particularly suitable for use in filling and/or packaging lines where the containers are made to advance in a vertical configuration.

Such a measurement unit 10 comprises a light source 10 for emitting a light beam 21 (schematically shown in FIG. 3) at a wavelength tunable with an absorption wavelength of a gas subjected to measurement present inside a container.

A detector 12 is further provided, arranged in such a way as to detect the light beam emitted by source 11 after at least one passage of the same through an inspection area 20 in which at least a part of sealed containers 30 passes. In particular, in the embodiment in FIG. 2, detector 12 is arranged facing the light source 11.

Detector 12 is therefore arranged in such a way as to receive the light beam 21 emitted by the light source 11, attenuated following the absorption occurred at the passage through the part of container 30 passing in the inspection area 20 due to the presence of the gas subjected to measurement inside such a container 30.

Detector 12 is adapted to output data representative of the absorption spectrum of the gas subjected to measurement by processing the light beam 21 which it receives in input. Based on the enlargement of the absorption line of the gas subjected to measurement, it is possible determine, in a known manner, the concentration of such a gas inside the sealed container 30.

The measurement unit 10 further comprises means 50 for generating, in container 30, a head space 32 of predetermined width, at which the spectral absorption measurement can be carried out.

In the specific embodiment shown in FIG. 2, the predetermined width 32 of the head space coincides with the width of the inspection zone 20. The means 50 for generating a head space 32 of predetermined width used in the first embodiment are discussed in more detail in FIG. 3.

Figure 3:
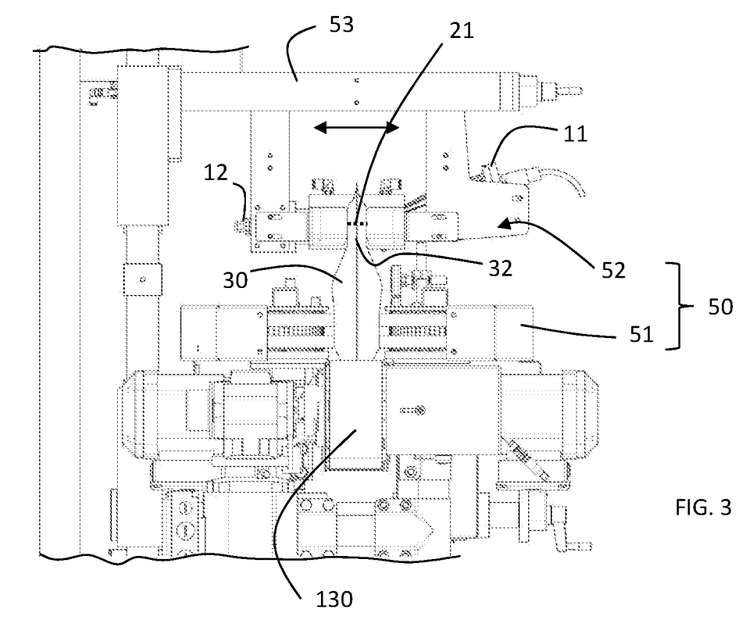
FIG. 3 is an enlarged detail of the non-destructive measurement unit of the gas concentration in sealed flexible containers in FIG. 2.

According to the present invention, the means 50 for generating a head space 32 are of dynamic type, i.e. capable of generating the head space 32 of predetermined width and maintain it during the advancement of container 30 along an advancement path A.

To this end, the means 50 for generating a head space 32 comprise a compression and/or advancement assembly 51 of container 30 placed at a first height and a containment channel 52 of container 30 placed at a second height different from the first one. In the embodiment shown, the compression and/or advancement assembly 51 is placed at a lower height while the containment channel 52 is placed at a higher height. This arrangement is particularly suitable since, in general, the contents of the container tends by gravity to position itself at the bottom of the container, leaving the upper part free, which is therefore a better candidate as a head space 32.

Figure 4:
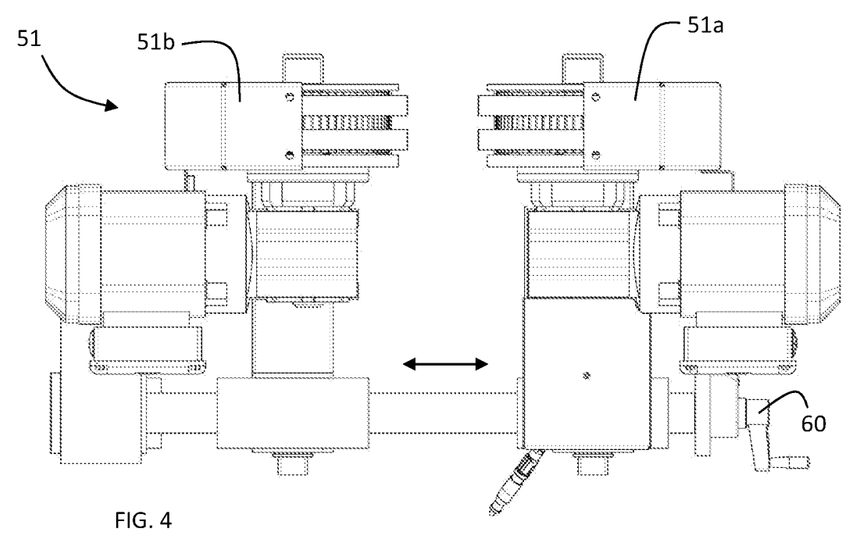
FIG. 4 is a second side elevation view of a part of the non-destructive measurement unit of the gas concentration in sealed flexible containers in FIG. 2.
Figure 5:
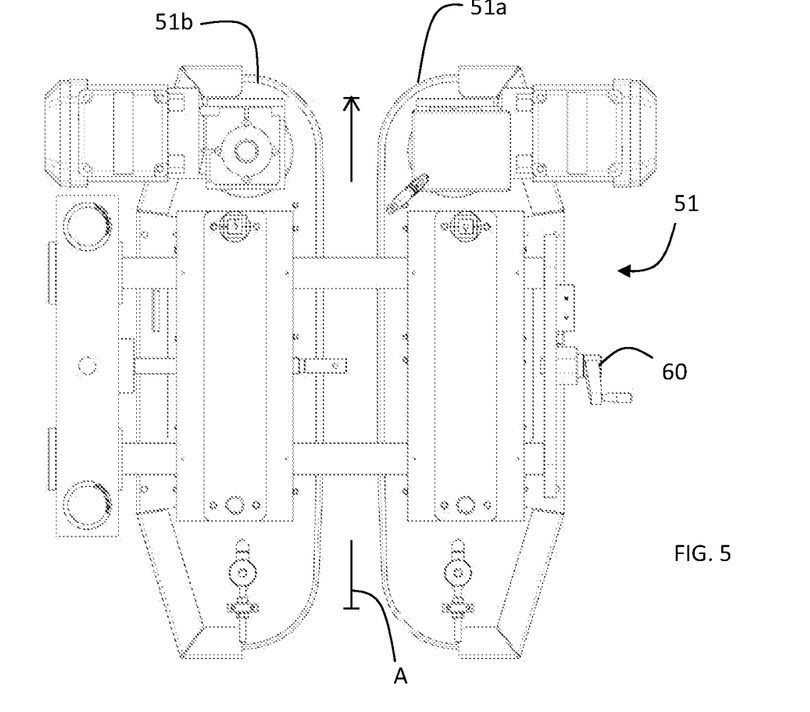
FIG. 5 is a bottom plan view of the non-destructive measurement unit of the gas concentration in sealed flexible containers in FIG. 2.
Figure 6:
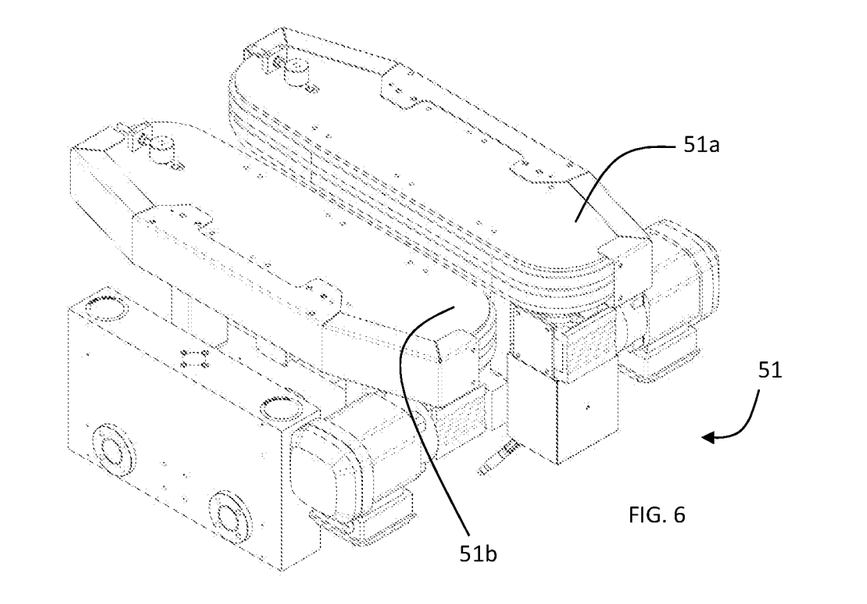
FIG. 6 is a perspective view of the non-destructive measurement unit of the gas concentration in sealed flexible containers in FIG. 2.

As shown in detail in FIG. 4-6, the compression and/or advancement assembly 51 of container 30 of the illustrated embodiment comprises a pair of motorized belts 51a, 51b facing in such a way as to slide about a vertical axis and placed facing each other so as to define an advancement passage for container 30.

Belts 51a, 51b of the pair of motorized belts are movable towards/away from each other in order to adjust the width of the advancement passage and therefore obtain the desired compression of container 30, as well as maintain it during the whole advancement path A defined by the same pair of belts 51a, 51b. To this end, appropriate distance adjustment means 60 are provided. In addition, the pressure applied to container 30 by the pair of motorized belts 51a, 51b is mechanically adjustable.

To this end, belts 51a, 51b are made, at least in the surface thereof facing outwards, of a material with a high friction coefficient in order to obtain a good engagement with container 30 and a uniform advancement of the same in the absence of relative slipping.

Figure 7A:
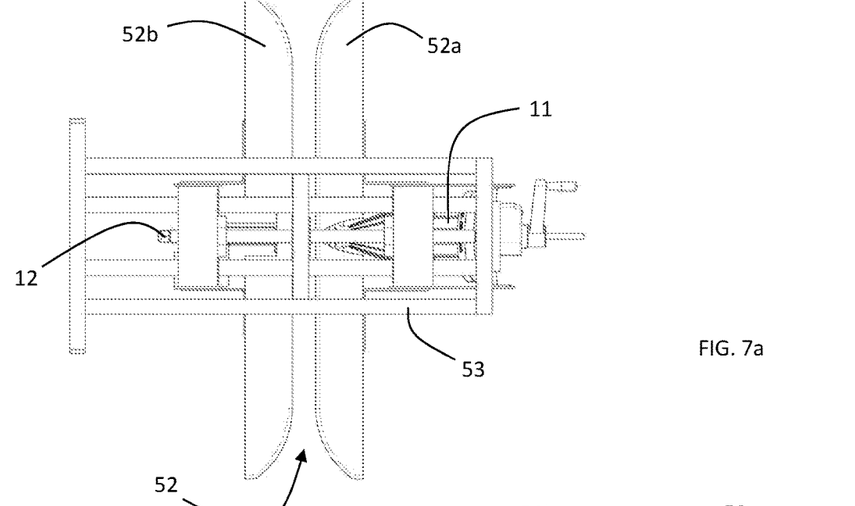
FIGS. 7a-7c are a plan view, a perspective view and a side elevation view, respectively, of a first embodiment of a detail of the non-destructive measurement unit of the gas concentration in sealed flexible containers in FIG. 2.
Figure 7B:
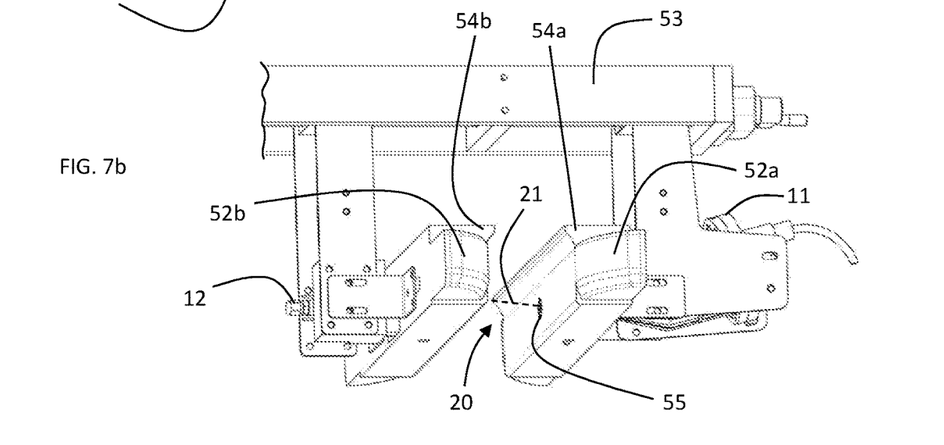
Figure 7C:
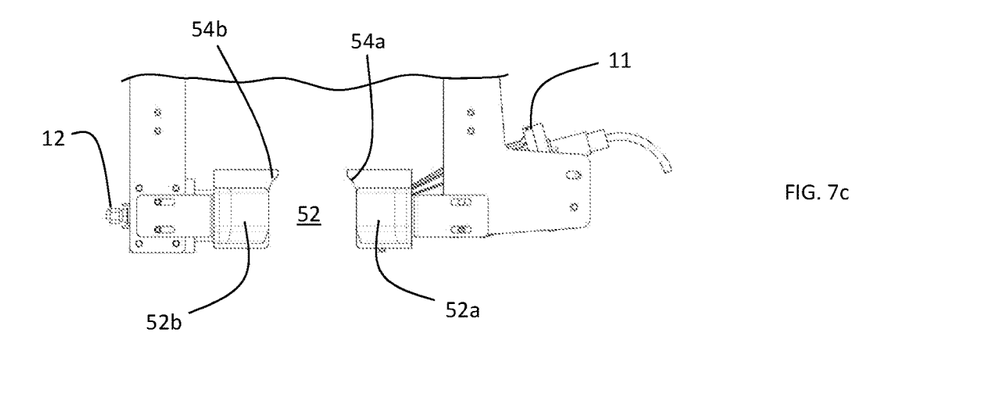

As shown in detail in FIGS. 7a-7c, the containment channel 52 is defined by a pair of containment guides 52a, 52b fixable at a predetermined distance from each other.

Each containment guide 52a, 52b comprises a longitudinal extension surface with a low friction coefficient in order to facilitate the passage of container 30.

Upper guides 53 (shown in detail in FIG. 7a) are provided in order to adjust the relative distance between the two guides 52a, 52b arranged across the extension of the containment guides 52a, 52b and to which the containment guides 52a, 52b are suspended. By translating the containment guides 52a, 52b along the upper guides 53 it is possible to approach or move away the containment guides 52a, 52b from each other and in this way vary the width of the containment channel 52.

The containment channel 52 limits the expansion of the container due to the compression carried out by the compression and/or advancement assembly 51 at channel 52 itself and thus allows obtaining a head space 32 of the container which is geometrically defined in terms of width. In fact, the head space 32 is delimited by the width of channel 52 which is in turn defined by the distance at which the containment guides 52a, 52b are positioned.

As better shown in FIGS. 7b and 7c, the longitudinal extension surface of the containment guides 52a, 52b has on top of it a portion 54a, 54b extending towards the interior of the containment channel, substantially defining a shaping of the containment surface provided with an upper portion.

The containment channel 52 passes through the inspection area 20. In fact, the light source 11 and detector 12 are positioned in such a way as to face towards the interior of the containment channel 52, thereby ensuring that the measurement is performed at the head space 32 delimited by channel 52. To this end, as better shown in FIG. 7a, the light source 11 and detector 12 are partially inserted in the containment guides 52a, 52b and face towards channel 52 from the longitudinal extension surface of such guides 52a, 52b through corresponding holes 55.

A plurality of gas outlet mouths 56 is provided around holes 55 for introducing a gas different from the measurement one into the channel.

This is particularly advantageous when the shape of container 30 is such a not to allow a perfect adhesion to the surfaces of the containment channel 52, leading to the formation of wrinkles that could suction air and thus alter the measurements. In fact, the gases generally subjected to measurement (oxygen, carbon dioxide and water vapor) are present in the air but in different concentration with respect to those of modified atmosphere within the containers. Therefore, a measurement that partially passes through the container and partially through an air bubble trapped in the wrinkles on the outer wall of the container could altogether alter the measurement result.

By blowing gas different from that of measurement (such as nitrogen) through mouths 56, towards the inspection area 20 it is possible to prevent the presence, outside the container, of the measurement gas at the point where the measurement is carried out.

FIGS. 8a-8d show a second embodiment of the containment channel 52. The guides of the pair of containment guides 52'a, 52'b are made substantially as described with reference to the embodiment shown in FIGS. 7a-7c, but they additionally comprise vacuum generation means 57, 58 which, by creating a slight vacuum, facilitate the adhesion of the surface of container 30 to the surfaces of the containment guides 52'a, 52'b.

Figure 8A:
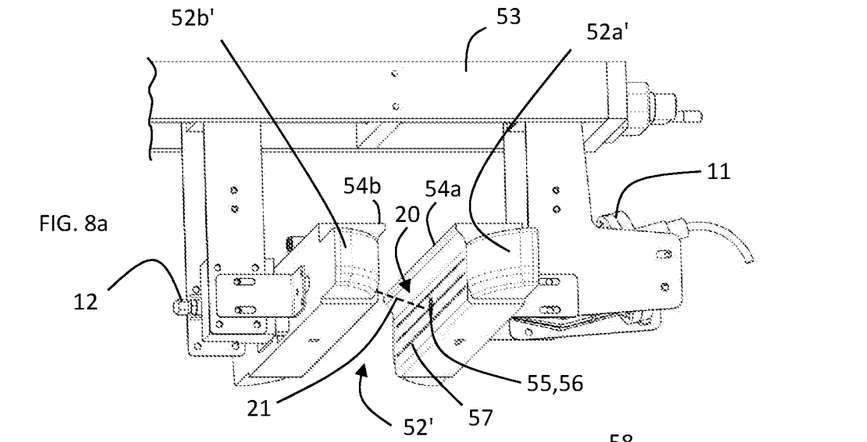
FIGS. 8a-8d are a perspective view, a side elevation view, a partial view and an enlarged detail of such a partial view, respectively, of a second embodiment of a detail of the non-destructive measurement unit of the gas concentration in sealed flexible containers in FIG. 2.
Figure 8B:
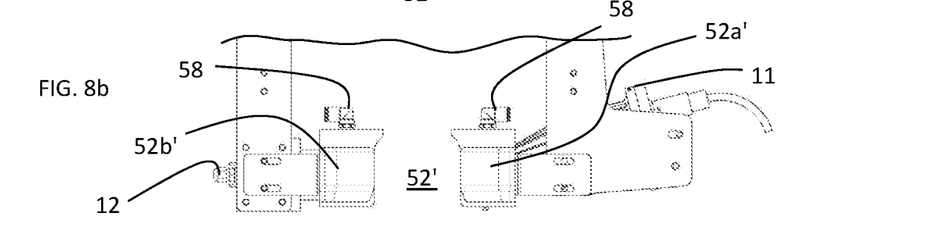
Figures 8C, 8D:
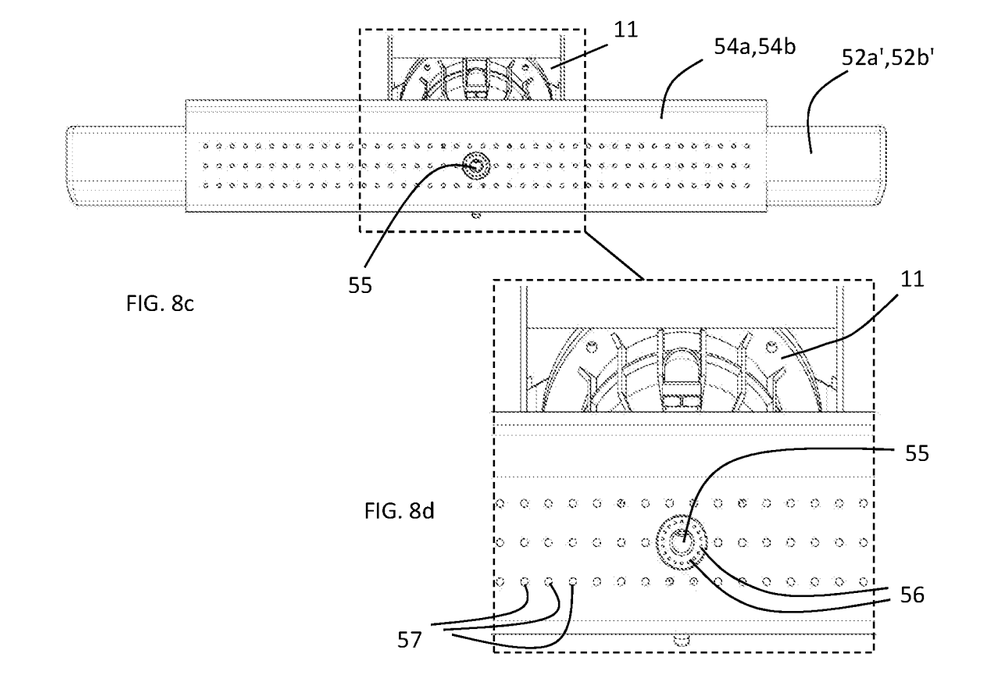

FIGS. 8a, 8c and 8d show openings 57 present on the surface of the containment guides 52'a, 52'b facing towards channel 52'. Such openings 57 are distributed along the entire extension of such a surface of the containment guides 52'a, 52'b so that, during the advancement, the flexible wall of container 30 may extend and contact such a surface before reaching holes 55 from which the light source 11 and detector 12 faces towards channel 52'.

FIG. 8*b* shows connections 58 for connecting the containment guides 52'*a*, 52'*b* to a vacuum generation source (not shown).

In association with the second embodiment of the containment channel 52' provided with vacuum generation means 57, 58, the compression and/or advancement assembly 51 substantially works as an advancement assembly. In fact, it exerts a minimal compression sufficient for the engagement with container 30 in order to entrain it in advancement.

Figure 9:
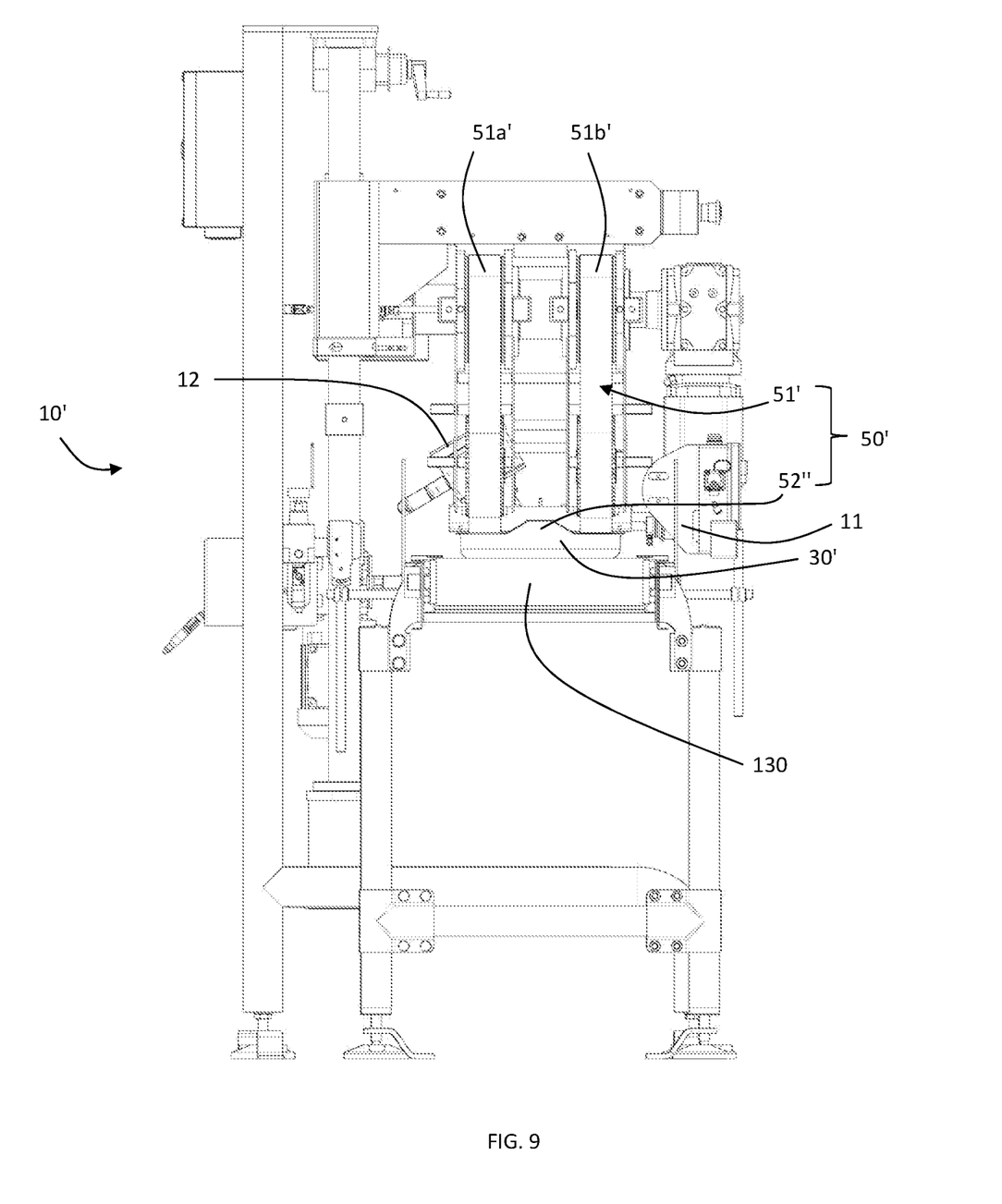
FIG. 9 is a side elevation view of a second embodiment of the non-destructive measurement unit of the gas concentration in sealed flexible containers according to the present invention.

With reference to the FIG. 9, a second embodiment of a non-destructive measurement unit 10 of the gas concentration in sealed flexible containers is shown, particularly suitable for use in filling and/or packaging lines where the containers are made to advance in a horizontal configuration.

Also in this case, the measurement unit 10' comprises a light source 11 for emitting a light beam 21 and a detector 12 arranged in such a way as to detect the light beam emitted by source 11 after at least one passage of the same through an inspection area 20 in which at least a part of a sealed container 30 passes.

Also in this case, the measurement unit 10 comprises means 50 for generating, in container 30, a head space 32 of predetermined width, at which the spectral absorption measurement can be carried out. Such means 50 for generating a head space 32 are of dynamic type, i.e. capable of generating the head space 32 of predetermined width and maintain it during the advancement of container 30 along an advancement path A passing through the inspection area 20.

The means 50 for generating a head space 32 used in the embodiment in FIG. 9 comprise a compression and/or advancement assembly 51' of container 30' which integrates a containment channel 52" of container 30'.

Figure 10:
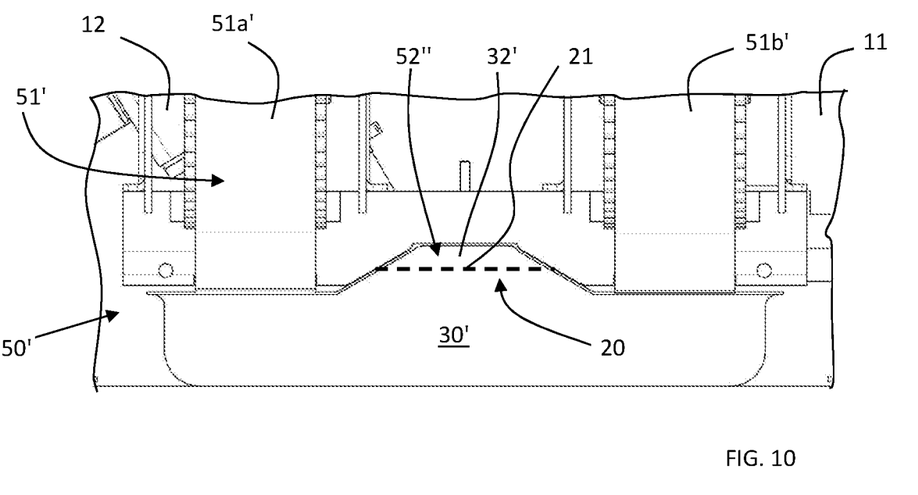
FIG. 10 is an enlarged detail of the non-destructive measurement unit of the gas concentration in sealed flexible containers in FIG. 9.
Figure 11:
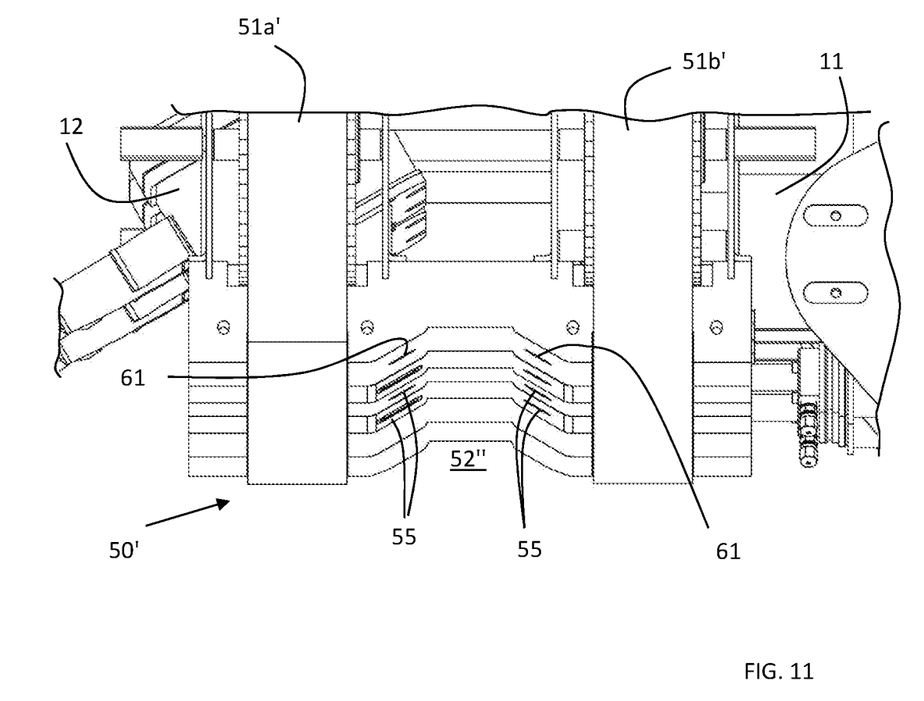
FIG. 11 is a perspective view of the detail shown in FIG. 10.

As shown in detail in FIGS. 10 and 11, the compression and/or advancement assembly 51' of container 30 of the embodiment shown comprises a pair of motorized belts 51*a'*, 51*b'* placed side by side and facing in such a way as to slide about a horizontal axis. The two motorized belts 51*a'*, 51*b'* are arranged spaced apart from each other in such a way as to act on two peripheral portions of container 30', respectively from top downwards, thus causing a swelling of the same at its upper central portion.

Belts 51*a'*, 51*b'* of the pair of motorized belts are movable towards/away from the advancement plane of containers 30' in order to adjust the width of the advancement passage and therefore obtain the desired compression of container 30, as well as maintain it during the whole advancement path defined by the same pair of belts 51*a'*, 51*b'*. In addition, the pressure applied to container 30 by the pair of motorized belts 51*a*, 51*b* is mechanically adjustable.

Also in this case, belts 51*a'*, 51*b'* are made, at least in the surface thereof facing outwards, of a material with a high friction coefficient in order to obtain a good engagement with container 30 and a uniform advancement of the same in the absence of relative slipping.

The containment channel 52" is defined by the lower surface of a longitudinal guide carried between the two belts 51*a'*, 51*b'*. The lower surface 52" of the longitudinal guide is concave, in particular its cross-section has a pattern with a trapezoidal shape. Such a concavity is intended to accommodate the swelling of the upper central portion of the container peripherally pressed downwards by the pair of belts 51*a'*, 51*b'*.

The lower surface 52" of the longitudinal guide has a low friction coefficient in order to facilitate the passage of container 30'.

The containment channel 52" guides the expansion of container 30' due to the compression carried out by the compression and/or advancement assembly 51 and laterally delimits it. It is therefore possible to obtain a head space 32' of the container geometrically defined in terms of width.

Also in this case, the light source 11 and detector 12 are positioned in such a way as to face towards the interior of the containment channel 52", thereby ensuring that the measurement is performed at the head space 32' delimited by channel 52". To this end, as better shown in FIG. 11, the light source 11 and detector 12 face towards channel 52" from the inclined portions of the lower surface of the longitudinal guide, through corresponding holes 55.

In particular, in the embodiment shown in FIG. 11, a plurality of mutually facing pairs of light source 11 and detector 12 is provided. In this way it is advantageously possible to measure the concentration of multiple gases within a same packaging 30', tuning the wavelength of the light beam emitted by each source with the absorption wavelength of the gas to be measured.

Moreover, a position detector 61 is implemented in the longitudinal containment guide able to detect the passage of a transiting container 30', thereby activating the pairs of light source 11 and detector 12 arranged downstream.

Although not shown, also in this embodiment it is possible to provide, around holes 55, a plurality of gas outlet mouths 56 for introducing a gas different from the measurement one into channel 52', in addition to a plurality of openings 57 for generating a slight vacuum to facilitate the uniform support of the central upper portion of container 30' against the inclined side walls of the lower surface 52' of the longitudinal guide. Also in this case, if the containment channel 52" comprises vacuum generation means 57, 58, the compression and/or advancement assembly 51' substantially works as an advancement assembly, exerting a minimal compression sufficient for the engagement with container 30' in order to entrain it in advancement.

Moreover, according to an embodiment not shown, the longitudinal guide carried between the two belts 51*a'*, 51*b'* is replaced by a pair of side guides side by side, each carried by a belt 51*a'*, 51*b'* and shaped in such a way as to define a containment channel 52" with substantially trapezoidal section.

Figure 12:
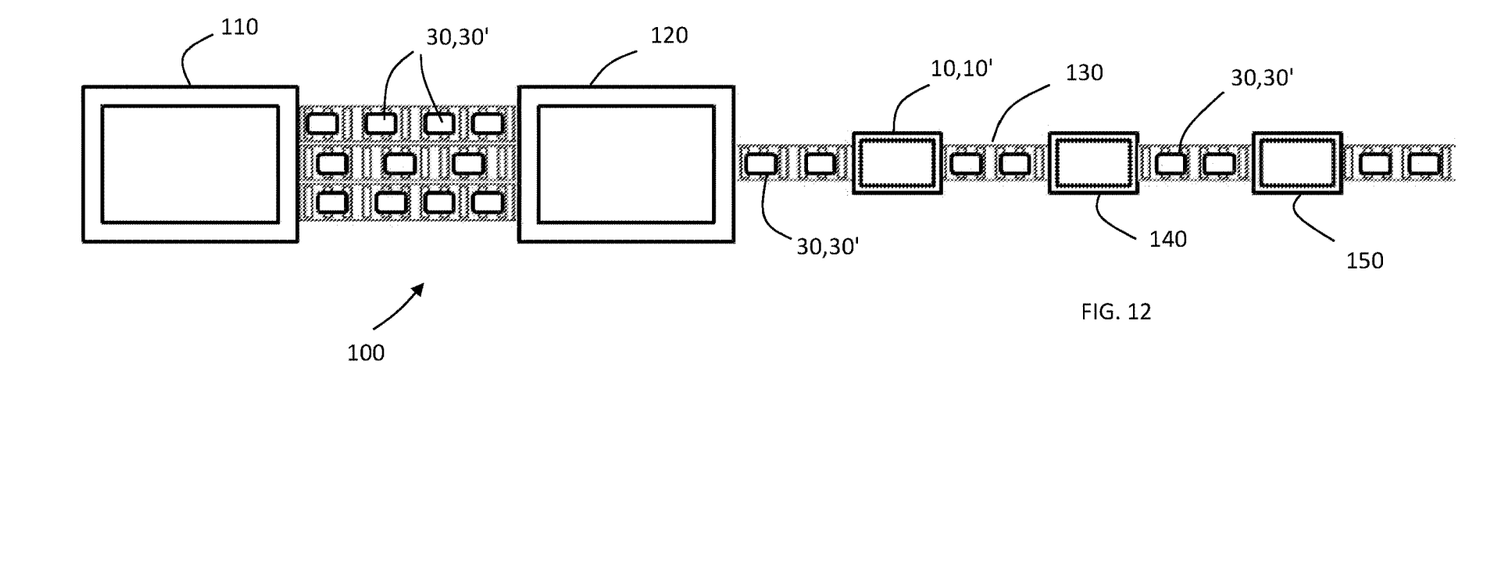
FIG. 12 is a schematic representation of a filling and/or packaging line according to the present invention.

The non-destructive measurement unit 10, 10' of the gas concentration in flexible containers 30, 30' is preferably comprised in an automatic filling and/or packaging line globally indicated with reference numeral 100 and shown by way of examples in FIG. 12.

Such a line 100 comprises a first filling station 100 of containers 30, 30' followed by a second sealing station 120 of containers 30, 30'. The measurement unit 10, 10' of the gas concentration in flexible containers 30, 30' is arranged downstream (either directly or not) of the second sealing station 120 of containers 30, 30' with respect to the advancement direction of containers 30 along line 100.

Containers 30, 30' are carried by dedicated advancement means 130, such as a set of constrained or free transportation means on conveyor belt or suspended, along an advancement path B which reaches the first 110 and the second 120 station to then pass through the measurement unit 10, 10'.

Further control stations 140, 150 are preferably provided downstream of the measurement unit 10, 10' for checking the weight and labeling of container 30, 30'.

The operation of the non-destructive measurement unit 10, 10' of the gas concentration in sealed flexible containers is as follows.

Entering into the measurement unit 10,10', the flexible containers 30, 30' engage with the compression and/or advancement assembly 51, 51' which makes them advance and at the same time exerts a slight compression towards the interior of container 30, 30', so that at the containment channel 52, 52', a portion of the container expands in a controlled manner. Such a configuration is maintained throughout the entire path A along which container 30, 30' crosses the measurement unit 10, 10'. Specifically, path A crosses the inspection zone 20 towards which the light source 11 e and detector 12 are facing to make the measurement.

The compression and/or advancement assembly 51, 51' therefore makes container 30, 30', in its configuration with a portion expanded in a controlled manner, cross the inspection area 20. In this way, a significant measurement is made from which it is possible to determine the concentration of the measurement gas, since it is carried out at a portion of container of known size.

In particular, if the containment channel 52, 52' so provides, a gas different from that of measurement may be blown into the passing container 30, 30'.

Moreover, if so provided by the containment channel 52, 52', the vacuum generation means 57, 58 may be actuated so that container 30, 30' reaches the inspection area 20 in stretched configuration and uniformly adhering to the surface of the containment channel 52, 52'.

The features of the non-destructive measurement unit of the gas concentration in sealed flexible containers as well as of the relative filling line object of the present invention are clear from the above description, as are its advantages.

Additional variations of the embodiments described above are possible without departing from the teaching of the invention.

Finally, it is clear that several changes and variations may be made to the non-destructive measurement unit of the gas concentration in sealed flexible containers to a relative filling line thus conceived, all falling within the invention; moreover, all details can be replaced with technically equivalent elements. In the practice, the materials used as well as the sizes, can be whatever, according to the technical requirements.

The invention claimed is:

1. A non-destructive measurement unit (10, 10') of gas concentration in sealed flexible containers (30, 30') at least partially made of optically transparent material, comprising:
   at least one light source (11) for emitting a light beam at a wavelength tunable with an absorption wavelength of a gas contained in the sealed flexible container (30, 30'), the at least one light source (11) being positioned in such a way as to direct the light beam towards at least one inspection area (20);
   at least one detector (12) positioned in such a way as to detect at least a portion of the beam emitted by the light source (11) once passed through the inspection zone (20) and output data representative of an absorption spectrum of said gas resulting from the passage of the light beam through the inspection zone (20); and
   means (50, 50') for dynamically generating a head space (32) having predetermined width in the sealed flexible container (30, 30');
   said means (50, 50') for generating a head space (32) comprise a compression and/or advancement assembly (51, 51') of the container (30, 30') and a containment channel (52, 52') of the container (30, 30') which crosses said inspection zone (20), said means (50, 50') for generating a head space (32) are adapted to advance said sealed flexible container (30, 30') by an advancement path (A) which crosses said inspection zone (20) and to maintain said predetermined width of said head space (32) during the advancement of the sealed flexible container (30, 30') along the whole advancement path (A).

2. The non-destructive measurement unit (10, 10') according to claim 1, wherein the compression and/or advancement assembly (51, 51') of the container (30, 30') comprises a pair of motorized belts (51a, 51b; 51a', 51b') placed side by side in such a way as to define an advancement passage between the same (51a, 51b; 51a', 51b') for the container (30, 30') and exert a compression onto the same, said containment channel (52, 52') of the container (30, 30') being made at said advancement passage.

3. The non-destructive measurement unit (10, 10') according to claim 2, wherein said motorized belts (51a, 51b) of said pair of belts are directed in such a way as to slide about a vertical axis and placed facing one another so as to exert a compression of the container (30) according to a horizontal axis.

4. The non-destructive measurement unit (10, 10') according to claim 2, wherein said motorized belts (51a', 51b') of said pair of belts are directed in such a way as to slide about a horizontal axis and exert a compression of the container (30') according to a vertical axis.

5. The non-destructive measurement unit (10, 10') according to claim 1, wherein the containment channel (52) is defined between a pair of containment guides (52a, 52b) fixable at a predetermined distance from each other.

6. The non-destructive measurement unit (10, 10') according to claim 5, wherein the surface of the pair of containment guides (52a, 52b) facing towards the containment channel (52) comprises on top of it a portion (54a, 54b) extending towards the interior of the containment channel (52), substantially defining an upper containment surface portion.

7. The non-destructive measurement unit (10, 10') according to claim 1, wherein the containment channel (52') is defined by the lower surface of a longitudinal guide carried between the two motorized belts (51a', 51b'), the lower surface (52') of the longitudinal guide being concave.

8. The non-destructive measurement unit (10, 10') according to claim 1, wherein the at least one light source (11) and the at least one detector (12) are positioned in such a way as to face towards the interior of the containment channel (52, 52') through respective holes (55) made on the surface of the containment guides (52a, 52b; 52').

9. The non-destructive measurement unit (10, 10') according to claim 8, wherein on the surface of the containment guides (52a, 52b; 52'), in the proximity of the holes (55) from which the at least one light source and the at least one detector (12) face towards the containment channel (52, 52'), the following is provided:
   a plurality of gas outlet mouths (56) for introducing a gas different from the measurement gas into the containment channel (52, 52'); and/or
   a plurality of openings (57) for connection to means for generating a vacuum for attracting the surface of the container (30, 30') against the surface of the containment guides (52a, 52b; 52').

10. The non-destructive measurement unit (10, 10') according to claim 2, wherein the containment channel (52) is defined between a pair of containment guides (52a, 52b) fixable at a predetermined distance from each other.

11. The non-destructive measurement unit (10, 10') according to claim 10, wherein the surface of the pair of containment guides (52a, 52b) facing towards the containment channel (52) comprises on top of it a portion (54a, 54b) extending towards the interior of the containment channel (52), substantially defining an upper containment surface portion.

12. The non-destructive measurement unit (10, 10') according to claim 3, wherein the containment channel (52) is defined between a pair of containment guides (52a, 52b) fixable at a predetermined distance from each other.

13. The non-destructive measurement unit (10, 10') according to claim 12, wherein the surface of the pair of containment guides (52a, 52b) facing towards the containment channel (52) comprises on top of it a portion (54a, 54b) extending towards the interior of the containment channel (52), substantially defining an upper containment surface portion.

14. The non-destructive measurement unit (10, 10') according to claim 4, wherein the containment channel (52) is defined between a pair of containment guides (52a, 52b) fixable at a predetermined distance from each other.

15. The non-destructive measurement unit (10, 10') according to claim 14, wherein the surface of the pair of containment guides (52a, 52b) facing towards the containment channel (52) comprises on top of it a portion (54a, 54b) extending towards the interior of the containment channel (52), substantially defining an upper containment surface portion.

16. The non-destructive measurement unit (10, 10') according to claim 2, wherein the containment channel (52') is defined by the lower surface of a longitudinal guide carried between the two motorized belts (51a', 51b'), the lower surface (52') of the longitudinal guide being concave.

17. The non-destructive measurement unit (10, 10') according to claim 3, wherein the containment channel (52') is defined by the lower surface of a longitudinal guide carried between the two motorized belts (51a', 51b'), the lower surface (52') of the longitudinal guide being concave.

18. The non-destructive measurement unit (10, 10') according to claim 4, wherein the containment channel (52') is defined by the lower surface of a longitudinal guide carried between the two motorized belts (51a', 51b'), the lower surface (52') of the longitudinal guide being concave.

* * * * *